March 1, 1966        J. J. RENS        3,237,602
ANIMAL HOLDER
Filed June 19, 1964        2 Sheets-Sheet 1
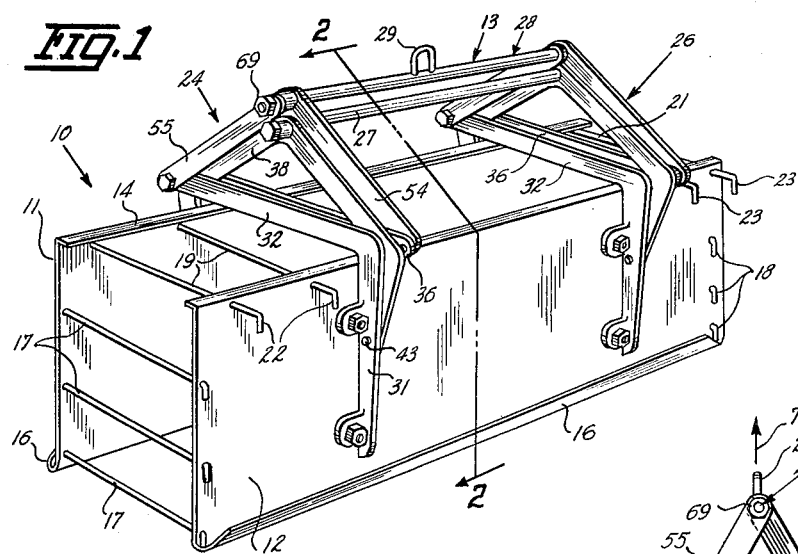
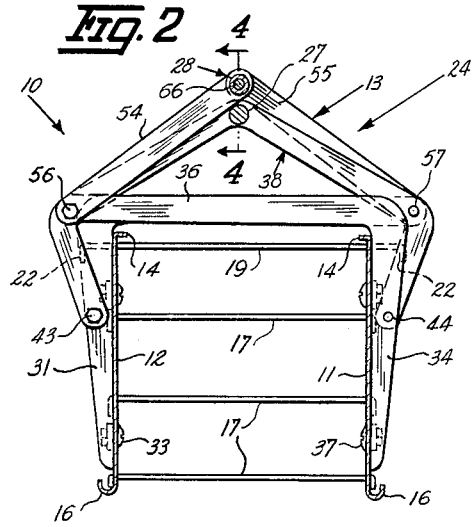
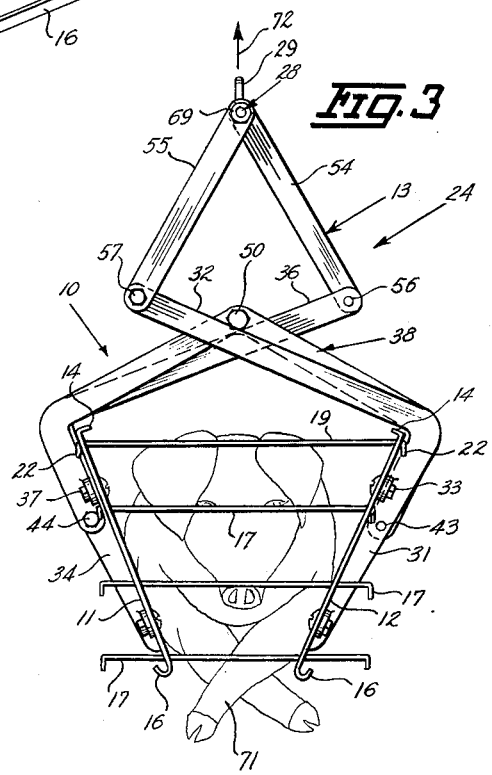
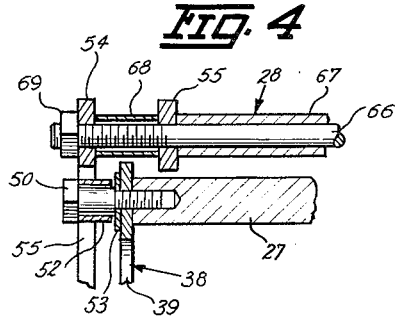
INVENTOR.
JOHN J. RENS
BY *Rudolph L. Powell*
ATTORNEY.

March 1, 1966     J. J. RENS     3,237,602
ANIMAL HOLDER

Filed June 19, 1964     2 Sheets-Sheet 2

INVENTOR.
JOHN J. RENS
BY Rudolph L. Lowell
ATTORNEY

United States Patent Office 3,237,602
Patented Mar. 1, 1966

3,237,602
ANIMAL HOLDER
John J. Rens, Oskaloosa, Iowa, assignor to Garvey Manufacturing Co., Inc., South Sioux City, Nebr., a corporation of Nebraska
Filed June 19, 1964, Ser. No. 376,399
3 Claims. (Cl. 119—98)

This invention relates to an apparatus for receiving and retaining creatures and more particularly to a holder operable to impose restraint upon an animal by embracing opposite sides thereof.

It is the object of this invention to provide an improved holder for receiving and restraining an animal, such as young hogs.

Another object of the invention is to provide a holder operable to embrace the opposite sides of a hog to immobilize the same.

A further object of the invention is to provide a lightweight and portable holder usable to support a hog in an elevated position.

An additional object of the invention is to provide a compact animal holder which is constructed from a minimum number of parts, is sturdy and economical in construction and reliable and effective in use.

These and other objects of the invention will become apparent with the consideration of the following description and accompanying drawing, wherein:

FIG. 1 is a perspective view of the animal holder of this invention;

FIG. 2 is an enlarged section view taken along the line 2—2 of FIG. 1;

FIG. 3 is a front elevational view of the holder embracing a hog;

FIG. 4 is an enlarged section view taken along the line 4—4 of FIG. 2; and

Figure 5:
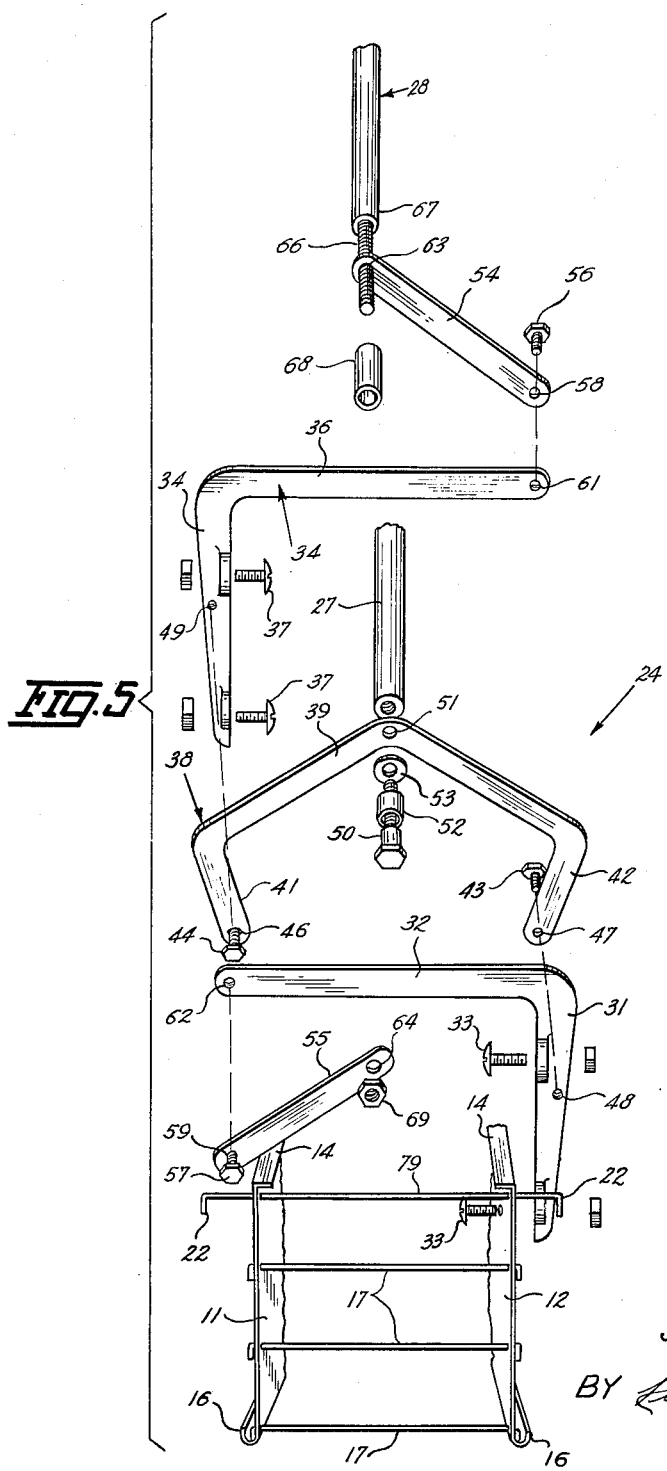
FIG. 5 is an exploded perspective view of the hinge mechanism of the animal holder of FIG. 1.

Referring to the drawing, there is shown in FIG. 1 the animal holder of this invention indicated generally at 10 in a position for receiving small animals, such as young hogs. The holder 10 comprises a pair of upright side plates 11 and 12 positioned in a spaced side-by-side relation. The plates 11 and 12 are mounted on a hinge mechanism indicated generally at 13. In use, the hinge mechanism 13 is contractible to hold the plates 11 and 12 in substantially upright parallel positions and is expandable to pivot each of the plates about longitudinal axes to move the bottom sections of the plates 11 and 12 toward each other.

The upright plates 11 and 12 are identical in size and shape and when connected to the hinge mechanism 13 are left and right-hand members. Each plate has an inwardly directed top flange 14 and an outwardly and upwardly directed bottom flange 16.

A plurality of vertically spaced barrier rods 17 project through suitable holes in the forward sections of the upright plates 11 and 12. The opposite end sections of each of the barrier rods project through the side plates 11 and 12 and are turned at right angles to hold the rods in assembled relation with the plates 11 and 12. The rods 17 being mounted on the plates 11 and 12 form a transverse fence or barricade. In a like manner the opposite end sections of the upright plates 11 and 12 carry transverse barrier rods 18.

Extended transversely across the top section of the opposite ends of the plates 11 and 12 are two pairs of top barrier rods 19 and 21 projected through suitable openings in the upright plates 11 and 12 immediately below the inwardly directed top flanges 14. The rods 19 and 21 are positioned in a common horizontal plane and are longer than the rods 17 and 18 to permit the separation of the upper sections of the plates 11 and 12. The opposite ends of the rods 19 and 21 project through the holes in the upright plates 11 and 12 and are turned at right angles to form fingers 22 and 23, respectively, which hold the rods in assembled relation with the plates 11 and 12.

The hinge mechanism 13 comprises two hinge units 24 and 26 which are secured to the upright plates 11 and 12. The hinge units 24 and 26 are identical in construction and function to articulately link the side plates 11 and 12. A pair of longitudinal rods 27 and 28 positioned above and centrally of the side plates 11 and 12 are secured at their opposite ends to the hinge units 24 and 26, respectively. The longitudinal rod 28 has a loop 29 secured to the central section thereof so as to enable the holder to be pendently connected to a hook.

Since the hinge units 24 and 26 are identical in construction the following description is limited to the hinge unit 24 which is best shown in FIG. 5. The hinge unit 24 comprises a first upright angle member 31 having a transverse arm 32 extended over the top of the plates 11 and 12. The angle member 31 is positioned adjacent the outside of the plate 12 and is secured thereto by nut and bolt assemblies 33. A second right angle member 34 having a transverse arm 36 is positioned adjacent the outside of the plate 11. The arm 36 is extended across the top of the plates 11 and 12 in a direction opposite the arm 32. Nut and bolt assemblies 37 secure the angle member 34 to the side of the plate 11.

The angle members 31 and 34 are pivotally coupled by a yoke 38 having an inverted V-shaped base 39 and converging and downwardly projected legs 41 and 42. Bolts 43 and 44 project through holes 46 and 47 in the ends of the legs 41 and 42 and are threaded into holes 48 and 49 in the upright sections of the angle members 31 and 34, respectively. The bolts 43 and 44 project substantially parallel to the longitudinal plane of the plates 11 and 12 and are positioned in a common horizontal plane at an elevation which is about two-thirds of the height of the upright plates 11 and 12.

The apex section of the base of the yoke 38 is connected to the end of the longitudinal rod 27 by a bolt 50 which projects through hole 51 in the base 39 and is threaded into the end of the rod 27. The bolt 50 has a cylindrical neck rotatably carrying a sleeve 52 spaced from the yoke 39 by washer 53.

The horizontal rod 28 is connected to the ends of the arms 32 and 36 by links 54 and 55. Bolts 56 and 57 project through holes 58 and 59 in the lower ends of the links 54 and 55 and are threaded into holes 61 and 62 in the outer ends of the arms 36 and 32, respectively. The upper ends of the links 54 and 55 have holes 63 and 64 for accommodating the threaded rod member 66 of the longitudinal rod 28. The rod member 66 telescopes through a cylindrical sleeve 67 carrying the loop 29, thereby permitting angular movement of the loop 29. The links 54 and 55 are spaced from each other by a sleeve 68 positioned about the rod member 66. A nut 69 holds the links 54 and 55 and sleeve 68 in assembled position on the rod member 66.

In use, to pick up an animal, such as a hog, the holder 10 is placed over the hog and lowered about the hog positioning the upright plates 11 and 12 adjacent the sides of the hog. The barrier rods 17 and 18 limit the forward and reverse movement of the hog and thereby confine the hog to the space between the upright plates 11 and 12.

To carry the hog 71, shown in phantom lines in FIG. 3, the longitudinal rod 28 is moved in an upright direction as shown by the arrow 72. The arms 32 and 36 being connected to the rod 28 by the links 54 and 55 are moved in an upward direction pivoting the plates in opposite directions about the bolts 43 and 44. The arms 32 and 36 angularly move upward in opposite directions into engagement with the rod 27 and the sleeve 52 which function as stops to maintain the angular position of the side plates 11 and 12. In this position the lower sections of the plates 11 and 12 are inclined toward each other to form a wedge engaging the opposite sides of the hog 71. The opening between the lower edges of the plates 11 and 12 is smaller than the width of the hog so that the hog's own weight forces him down into the inclined plates 11 and 12. Thus, the hog wedges itself against the inclined plates 11 and 12. With a large sized hog the inclination of the upright plate members 11 and 12 forces the legs of the hog 71 to a crossed position.

To release the hog 71 from the holder 10, the rod 28 is moved in a downward direction toward the rod 27. The links 54 and 55 transmit force to the arms 36 and 32, respectively, pivoting the plates 11 and 12 about the bolts 43 and 44 to a substantially parallel upright position thereby moving the plates 11 and 12 from the sides of the hog 71. In this position the holder 10 is raised above the hog. With suitable inducement the hog is free to walk to the feed lot.

In summary the holder 10 is operable to receive and restrain an animal such as a young hog by embracing the opposite sides of the hog and holding the legs of the hog in a crossed position. This is accomplished by the use of a pair of upright plates which are positionable adjacent the sides of the hog. The plates are interconnected with a hinge mechanism 13 which is movable to expanded and contracted positions for pivoting the plates about separate longitudinal axes. When the hinge mechanism 13 is in the expanded position as shown in FIG. 3 the upright plates 11 and 12 converge downwardly toward each other and firmly embrace the opposite sides of the hog positioned therebetween. Barrier rods 17 and 18 extended transversely through the opposite ends of the plates 11 and 12 confine the hog to the area between the plates 11 and 12.

When the hinge mechanism 13 is in the contracted position as shown in FIG. 2 the plates 11 and 12 are in upright planes and are substantially parallel to each other. In this position the transverse distance between the plates 11 and 12 is at a maximum.

While there have been shown, described, and pointed out the novel features of the invention it is to be understood that various omissions, substitutions, changes in form and details of the apparatus illustrated may be made by those skilled in the art, without departing from the spirit of the invention which is intended to be limited only as indicated by the scope of the following claims.

I claim:
1. An apparatus for receiving and retaining a creature having upright opposite sides comprising:
 (a) a pair of upright plates positioned in a spaced side-by-side relation,
 (b) first arm means secured to one of said plates and projected laterally therefrom toward the other side plate,
 (c) second arm means secured to the other of said plates and projected laterally therefrom toward said one side plate,
 (d) yoke means extended over said plates, said yoke means having opposite ends pivotally connected to corresponding side plates, and
 (e) means pivotally connected to the ends of the first arm means and second arm means whereby upon upward movement of the last means the lower sections of the plates move toward each other.
2. The apparatus defined in claim 1 including:
 (a) barrier means slidably connected to the opposite end sections of the upright plates for confining the creature to the space between the plates.
3. An apparatus for receiving and retaining a hog comprising:
 (a) a pair of upright plates positioned in a spaced side-by-side relation,
 (b) first arm means secured to one of said plates and projected laterally therefrom toward the other side plate,
 (c) second arm means secured to the other of said plates and projected laterally therefrom toward said one side plate,
 (d) rod means secured to said first arm means and said second arm means and operable to angularly move each plate about axes projected longitudinally of the plates, and
 (e) yoke means extended over said plates, said yoke means having opposite ends pivotally connected to corresponding side plates.

References Cited by the Examiner

UNITED STATES PATENTS

| | | | |
|---|---|---|---|
| 554,714 | 2/1896 | Murphy | 294—118 |
| 1,764,522 | 6/1930 | Primm | 119—98 |
| 2,229,359 | 1/1941 | York | 294—118 |
| 2,381,045 | 8/1945 | Gammel | 294—119 |
| 2,561,207 | 6/1951 | Kellner | 294—119 |
| 2,586,843 | 2/1952 | McDonald | 294—118 |
| 2,680,425 | 6/1954 | Hagel | 119—98 |

SAMUEL KOREN, *Primary Examiner.*

ALDRICH F. MEDBERY, *Examiner.*